United States Patent
Clark et al.

[11] 3,956,623
[45] May 11, 1976

[54] DIGITAL PHASE DETECTOR

[75] Inventors: Thomas E. Clark; Robert J. Tracey, both of San Mateo; Ronald J. Violet, Belmont, all of Calif.

[73] Assignee: GTE Automatic Electric Laboratories Incorporated, Northlake, Ill.

[22] Filed: Oct. 21, 1974

[21] Appl. No.: 516,834

[52] U.S. Cl. .................................. 235/186; 178/68; 328/133; 235/156
[51] Int. Cl.² ...................... G06F 15/34; H03B 3/04
[58] Field of Search .......... 235/186, 189, 152, 156, 235/164; 325/320; 178/67, 68; 328/133, 155; 329/104, 126; 324/83 D; 444/1

[56] References Cited
UNITED STATES PATENTS

| | | | |
|---|---|---|---|
| 3,551,664 | 12/1970 | Mebus ............................... | 235/164 |
| 3,588,710 | 6/1971 | Masters............................. | 328/133 |
| 3,624,520 | 11/1971 | Perkins, Jr. et al............... | 178/68 X |
| 3,746,995 | 7/1973 | Schroeder et al................. | 178/67 X |
| 3,825,737 | 7/1974 | Croisier ............................ | 235/186 |

*Primary Examiner*—Joseph F. Ruggiero
*Attorney, Agent, or Firm*—Leonard R. Cool; Douglas M. Gilbert

[57] ABSTRACT

A digital phase detector which periodically detects the phase angle $\theta_k$ of a carrier signal in which data are encoded as phase changes. A coherent or differential phase-modulated carrier signal is split into its in-phase and quadrature phase components $R_o\sin\theta(t)$ and $R_o\cos\theta(t)$. Each signal component is sampled at a predetermined modulation interval and converted into a digital word having the form $R_o\cos\theta_k$ and $R_o\sin\theta_k$. In one configuration, the two signal components are applied to a digital divider network which forms the quotient $\Psi$ of the two digital words such that $|\Psi| \leq 1$. The quotient $\Psi$ is applied to a data look-up ROM, programmed for $\tan^{-1}$ operation, which forms a digital reference phase angle $\Phi$ limited to an angle $\leq 45°$ is corrected by selection logic to form the desired phase angle $\theta_k$. Once $\theta_k$ is known for each modulation interval, the encoded data may be readily extracted, since $\theta_k$ represents the encoded data.

17 Claims, 9 Drawing Figures

DIGITAL PHASE DETECTOR

BACKGROUND OF THE INVENTION

The present invention relates to the art of data communications and specifically to the demodulation of serial-binary data signals from a phase modulated carrier.

The transmission of digital data commonly takes place over telephone communication facilities. Voice-grade telephone channels are convenient for such purposes; however, telephone channels are not the perfect data transmission media users would otherwise desire. Frequency limitations, nonlinear phase distortion, and nonlinear amplitude distortion are common problems in using telephone channels. Data sets currently in use employ multiphase modulation, either four-phase or eight-phase with some form of line equalization, to overcome many of these telephone channel deficiencies.

There are two conventional methods used to demodulate digital multiphase signals: coherent detection and differential detection. In coherent detection (also called fixed reference detection), the absolute carrier phase reference must be recovered at the receiver so that the carrier phase may be compared or subtracted from the modulated signal phase. Differential or comparison detection is usually used in data sets which operate over telephone lines, since telephone lines are rarely stable enough to preserve the absolute carrier phase. In differential systems, the digital data is encoded in terms of phase changes, and detection is performed by comparing the phase of successive signal samples.

DESCRIPTION OF THE PRIOR ART

Demodulation of bandlimited phase modulated signals is well known in the prior art. Receivers have used analog techniques for some time to detect the number of zero crossings in a phase modulated carrier signal. By counting the number of zero crossings in a carefully measured time interval or by measuing the time between zero crossings, a signal functionally related to the encoded phase may be obtained. U.S. Pat. No. 3,128,343 issued on Apr. 17, 1964 to P. A. Baker discloses such an analog technique. Analog systems have certain drawbacks, however. First, they are expensive to build and difficult to cost reduce in comparison with the economic advancements of digital circuitry. Second, the use of analog adaptive equalizers in such systems are very complex and also expensive.

Advances in the prior art have been made with the development of digital circuits. U.S. Pat. No. 3,746,995 issued on July 17, 1973 to H. C. Schroeder, et al, discloses a particular digital demodulator which uses counting techniques to detect a differential eight-phase modulated carrier signal. However, the up-conversion process used by Schroeder is an expensive technique and is a potential source of distortion which can result in errors in the demodulated data. More recent developments in the prior art require an explanation of the content of multiphase modulation.

A phase-modulated signal of the type discussed above, may be represented by the following expression.

$$x(t) = r(t) \cos[\omega_c(t) + \gamma(t)] \qquad 1.$$

where:

$r(t)$ is the signal envelope and is a complex function of time;

$\omega_c$ is the carrier frequency in radians, and $\gamma(t)$ contains the encoded binary data.

This is generally described in chapter 9 of Principles of Data Communication by R. W. Lucky, et al, (McGraw Hill Book Company, 1968).

A telephone channel modifies the above signal by introducing a nonlinear time variant phase shift and amplitude distortion, so that an input signal to a receiver of a data modem could be represented by the following expression:

$$X(t) = R(t) \cos[\omega_c(t) + \gamma(t) + \alpha(t)] \qquad 2.$$

where:

$R(t)$ is the new signal envelope, and $\alpha(t)$ is the phase shift introduced by the communications channel.

As discussed in the above reference, this signal is structured the same as a double sideband suppressed carrier amplitude modulated signal. This means that if the above signal is broken down into its quadrature components, one could define the composite phase as a function of the inverse tangent variable. This fact could be very useful in the physical realization of a digital demodulator, as discussed in Principles of Data Communication referred to above and as was recognized by A. Croisier in U.S. Pat. No. 3,825,737, issued July 23, 1974. Croisier believed that an improved digital phase detector should avoid the use of digital multipliers and/or digital dividers since he felt they were a source of major cost and complexity. By using integrated digital devices (specifically Read-Only Memories—ROMs), Croisier demonstrated how to build a digital detector without the use of either multipliers or dividers. The basis of Croisier's belief that digital multipliers and dividers should be avoided is probably not true today with recent advancements in the state of the art of digital microcircuitry.

SUMMARY OF THE INVENTION

The present invention advances the current state of the art by providing a method of demodulating a coherent or differential phase-modulated carrier, and which is capable of being implemented almost entirely with digital microcircuitry. A phase splitter network divides the received phase modulated signal into in-phase and quadrature phase components. Analog-to-digital converters digitize the two analog quadrature signals so that a digital division of the two digital words can take place. The division is uniquely carried out using comparison techniques to assure that the quotient of the quadrature signals is always less than or equal to a magnitude of one. The reason the quotient is kept less than or equal to one is that it permits the quotient signal to be applied to a Read-Only Memory (ROM) inverse tangent look-up table to obtain an accurate value of the angle which corresponds to the phase of the signal sample. Then by testing the polarity (sign) and comparative magnitude of each quadrature signal, a phase correction is applied to the ROM output signal to place the phase angle in the correct octant (or quadrant in a four phase system). Once the exact phase of a signal sample is known the digital data may be easily recovered by either subtracting together two successive samples (which would be used in a differential modulation system) or by subtracting the absolute phase of the carrier signal from the demodulated samples (which would be used in a coherent modulation system). The tribit encoded data can then be recovered by decoding the difference phase.

A major benefit of this approach is that each step in the angle calculation is amenable to implementation with microdigital circuitry dedicated to the phase angle calculation process described here. Furthermore, the same functions and many more may be implemented using the central processor as shown in FIG. 3. The major benefit in using a central processing unit is that the circuitry need not be dedicated to the relatively simple task of phase angle calculation, but may additionally be used to perform other functions normally required in data sets. Besides performing all the customary receiver operations, such as interface and sequence control, passband equalization, phase demodulation, and differential phase estimation and correction, the central processing unit may also be time shared for control of many transmit functions, which would be used for duplex data transmission. The use of a central processing unit (CPU) to perform all these functions represents a distinct improvement over the prior art.

BRIEF DESCRIPTION OF THE DRAWINGS

The principles of this invention will be best understood by reference to the detailed description of the invention in conjunction with the drawings.

DETAILED DESCRIPTION OF THE INVENTION

Figure 1A:
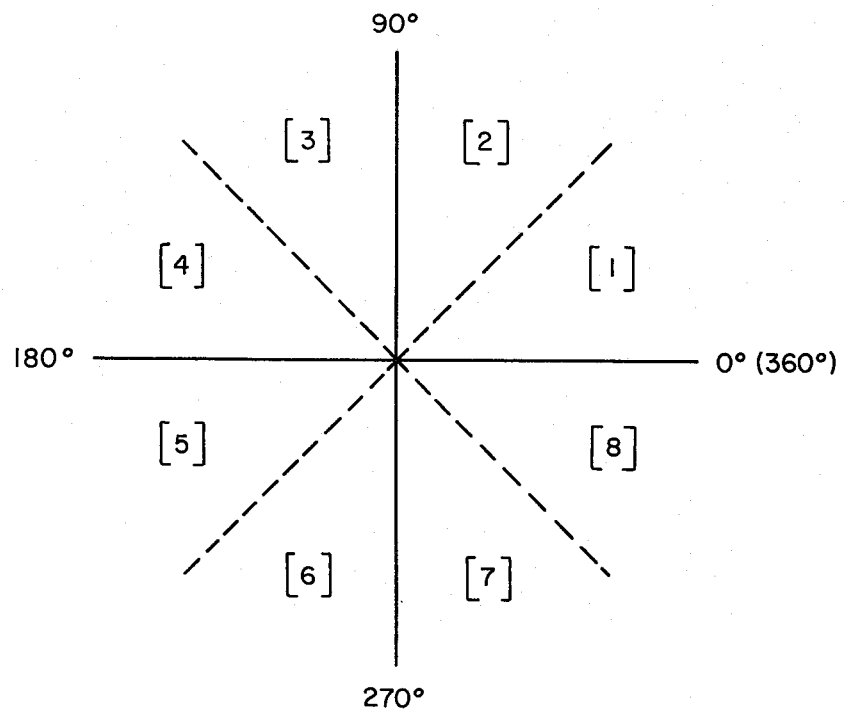
FIGS. 1A – 1B illustrate the numbering of the octants in an 8-phase system as described herein, and the vector representation of the possible phase changes in an 8-phase system.
Figure 1B:
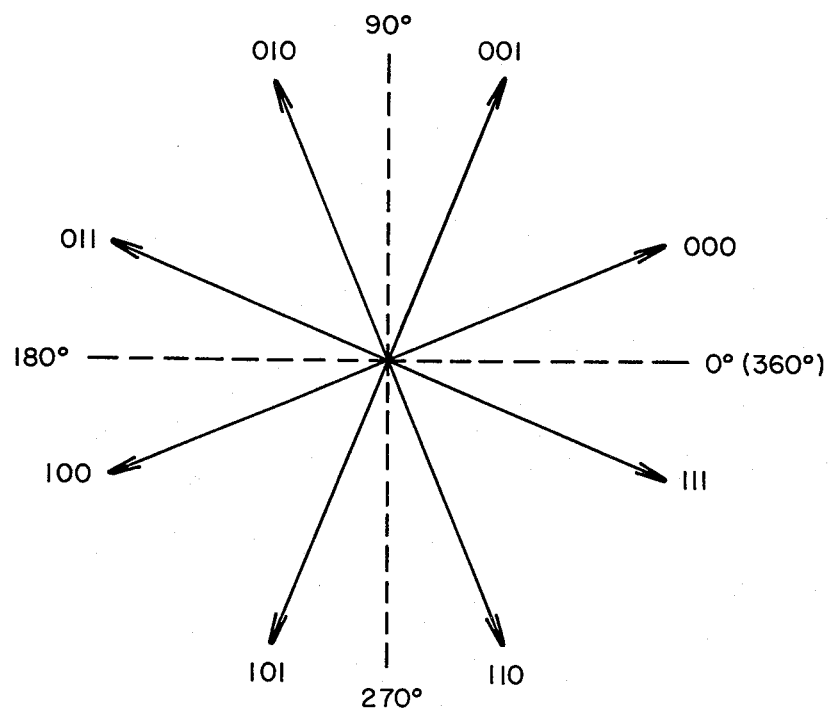

Although the following description is given in terms of differential 8-phase operation, the present invention is applicable to any double sideband data system using a waveform as defined by equation 1. This is also true irrespective of the particular coding used at the modulator. The following description, however, assumes for purposes of convenience that the coding used is as shown in FIG. 1B.

The theory of differential encoding of serial binary data in dibits (four-phase operation) and in tribits (eight-phase operation) is well known in the prior art and will not be discussed in detail. Reference is made to Chapter 10 of Data Transmission by W. R. Bennett and J. R. Davey (McGraw Hill Book Company, 1965) for this purpose. FIG. 1A shows a standard octant numbering as used herein in an eight-phase system. FIG. 1B shows for the same eight-phase system a vector diagram which indicates how three serial bits (a tribit) may be grouped and encoded as particular phase changes of 45° increments. This means that the data information is contained in the difference between two adjacent symbol phases. A phase change of 22.5° (e.g., a phase change from 90° to 112.5°) would be represented by the 000 phase vector in FIG. 1B.

Figure 2:
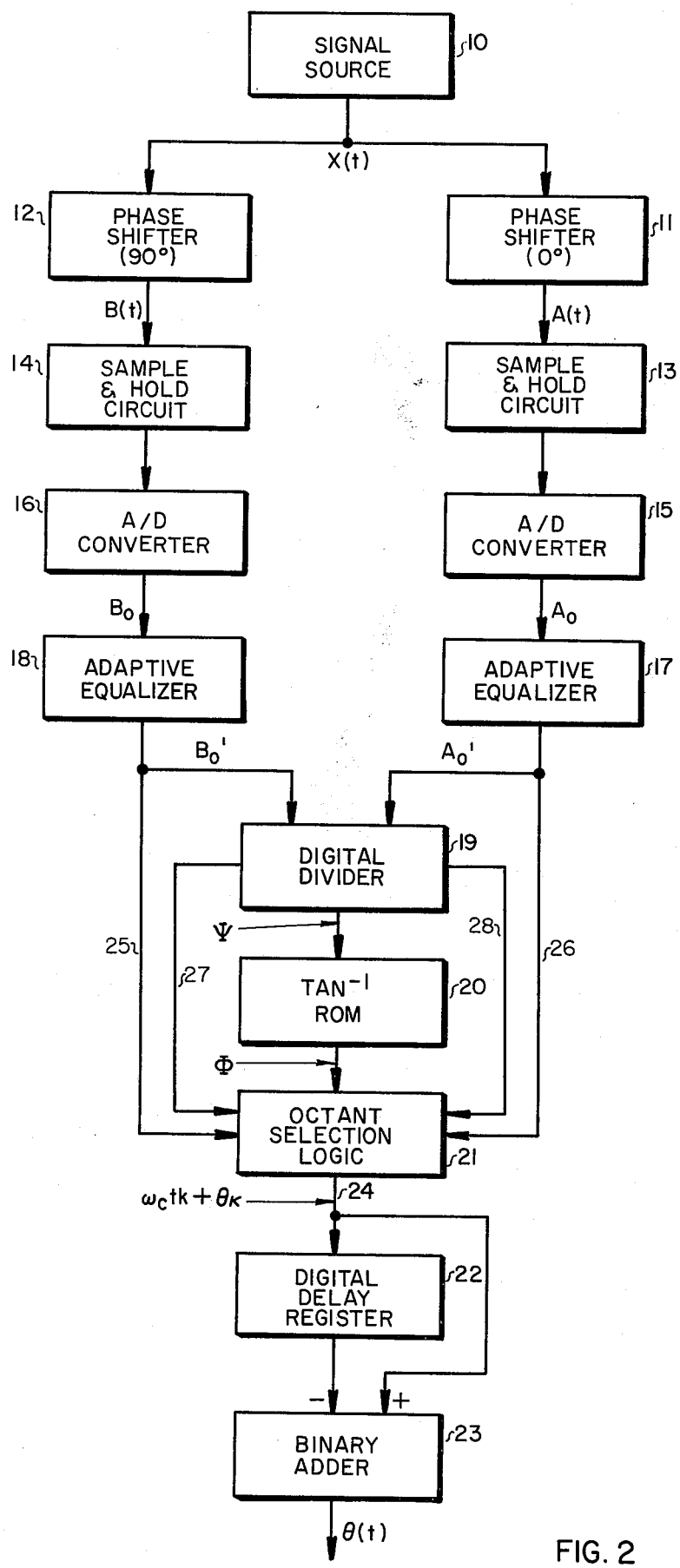
FIG. 2 is a block diagram of one embodiment of the digital phase detector.

FIG. 2 shows a particular embodiment of the demodulator circuit, and is useful in understanding the method used to perform the demodulation. Signal source 10 in FIG. 2 is assumed to generate a signal having the same structure as that given by equation (2) above. This signal is applied to two phase-shifting networks 11 and 12, which split the input signal into the in-phase (0° phase shift) and quadrature-phase (90° phase shift) components. As is well known, such filter networks could be built using all pass networks having a constant phase shift over the frequency band of interest. The two output signals, designated as $A(t)$ and $B(t)$ in FIG. 2 may generally be represented as $A(t) = R(t) \cos(\omega_c t + \theta(t))$ and $B(t) = R(t) \sin(\omega_c t + \theta(t))$, where, $\theta(t)$ is the received phase angle $\gamma(t) + \alpha(t)$. Sample and hold (S/H) circuits 13 and 14 serve to sample the analog signals $B(t)$ and $A(t)$ to provide the analog-to-digital (A/D) converters 15 and 16 with a constant input level during the interval in which digital conversion takes place. (Such S/H circuits could be implemented with a single switch, capacitor, and shunt resistor.) These sample-and-hold circuits, however, are optional depending upon the particular type of A/D converter used. For example, if a tracking A/D converter is used, then the use of sample-and-hold circuits is not required.

Conventional A/D converters 15 and 16 generate a parallel, 8-bit digital word in which the first bit, called the most significant bit (MSB) is indicative of the polarity of the sampled analog signal. This is generally called signed magnitude representation. The remaining seven bits are encoded samples representing the amplitude of the signal sampled. Thus, the signal is quantized into $2^8$ possible levels. In an 8-phase system an 8-bit digital word is required for sufficient accuracy. The number of bits which is required by a system depends upon the degree of accuracy desired. An even number of bits, however, should be chosen for the particular word length inasmuch as digital logic circuits and registers are manufactured in pairs or groups of four.

The two eight-bit words, referred to as $a_o$ and $B_o$, are applied to adaptive equalizers 17 and 18. These two equalizers are not essential to the phase angle detection, however, their use is most desirable in date systems using eight-phase modulation when the transmission medium introduces phase and amplitude nonlinearities. At the output of equalizers 17 and 18 there appears the $B_o'$ and $A_o'$ quadrature digitized samples. (The prime indicating equalized signals.) These sampled signals are represented by $B_o' = R_o \sin(k\omega_c t + \theta_k)$ and $A_o' = R_o \cos(k\omega_c t + \theta_k)$, where $R_o$ is the sampled amplitude term which is a constant value for a particular sample, $\theta_k$ is the phase angle of the $k^{th}$ sample, and $k\omega_c t$ is the $k^{th}$ sample of the carrier.

Digital divider circuit 19 performs a digital division of the two input signals $A_o'$ and $B_o'$ to form either $$\left| \frac{A_o'}{B_o'} \right| = \left| \frac{R_o \cos(k\omega_c t + \theta_k)}{R_o \sin(k\omega_c t + \theta_k)} \right| = \cot(k\omega_c t + \theta_k)$$

or $$\left| \frac{B_o'}{A_o'} \right| = \left| \frac{R_o \cos(k\omega_c t + \theta_k)}{R_o \sin(k\omega_c t + \theta_k)} \right| = \tan(k\omega_c t + \theta_k).$$

To determine which quotient to form, divider 19 compares the relative magnitudes of $A_o'$ and $B_o'$ so that the larger signal may be made the divisor and the smaller signal may be made the dividend. Thus, the division is performed so that the digital quotient is always equal to or less than a magnitude of one. Digital dividers are well known in the art; see pp. 434 and 435 of Digital Computer Design Fundamentals, by Y. Chu (McGraw Hill Book Company, Inc., 1962). Comparator circuits which evaluate the relative magnitude of the $A_o'$ and $B_o'$ samples are also well known in the art. The two four-bit magnitude comparators, Ser. No. 7485, manufactured by Texas Instruments Incorporated, Dallas, Tex., may, by way of example, be used in this application.

The quotient is then applied to ROM 20, which performs an arc tangent translation of the input signal. Commercially available devices such as the 4096 bit ROM manufactured by Fairchild Semiconductor Company, Mountain View, Cal., part no. 3514, would function as ROM 20. ROM 20 is programmed to provide the arc tangent function for arguments between 0° and 45°.

When the $B_o'/A_o'$ quotient is translated by ROM 20, the output is clearly seen to be $\tan^{-1} \tan(k\omega_c t + \theta_k)$. When the $A_o'/B_o'$ quotient is as $\cot(k\omega_c t + \theta_k)$ and applied to ROM 20, the translated decoded angle is $90°$ $(k\omega_c t + \theta_k)$. This is due to the following trigonometric identities: $\tan^{-1} [\cot (k\omega_c t + \theta_k)] = 90° - \cot^{-1} [\cot (k\omega_c t + \theta_k)] = 90° - (k\omega_c t + \theta_k)$. ROM 20 decodes the tangent or cotangent function to obtain the desired phase angle. The tangent of an angle between 45° and 90° rapidly approaches infinity, and the accuracy of decoding such an angle decreased rapidly as the angle approaches 90°. For this reason, the digital divider 19 performs the $A_o'/B_o'$ division when the phase angle $k\omega_c t + \theta_k$ is in the second octant, i.e., between 45° and 90°. The $A_o'/B_o'$ cotangent function is also formed for phase angles in the 3rd, 6th, and 7th octants since the $B_o'/A_o'$ tangent function is greater than one in these octants. By keeping the quotient confined to a value less than one the quantizing error is kept to a minimum.

The output of $\Phi$ ROM 20 is a parallel 8-bit digital word which represents a reference angle equal to either $\theta_k$ or $90° - \theta_k$, where $\Phi$ is limited to angles less than or equal to 45°. ($\Phi$ also contains a carrier term $k\omega_c t$ which is being ignored for the moment for purposes of clarity). Although any number of codings exist, the particular coding used to represent $\Phi$ is shown in Table I below. The two most significant bits, MSBs ($T_1$ and $T_2$) will always be zero since $\Phi$ has been limited to angles 45° or less.

To extract the exact phase angle $\theta_k$ from the reference angle $\Phi$, octant selection logic 21 is used. The octant that contains phase angle $\theta_k$ must first be determined before the phase angle itself can be determined. The two tables given below uniquely define the particular octant of interest. Table II below indicates how the polarity of quantities $A_o' - B_o'$, $A_o' + B_o'$, and either $A_o'$ or $B_o'$ relate to the particular octant, and what correction must be applied by octant selection logic 21 to the reference angle $\Phi$. Table III below indicates another method which uniquely determines the octant of interest. In this method by testing not only the polarity but also the magnitude of signal samples $A_o'$ and $B_o'$ the exact octant can again be precisely defined.

TABLE II

| Octant | Polarity $A_o'+B_o'$ | Polarity $A_o'-B_o'$ | Polarity of $A_o'$ or $B_o'$ | Correction Required |
|---|---|---|---|---|
| 1 | + | + | $B_o'+$ | None |
| 2 | + | − | $A_o'+$ | $90° - \tan^{-1}\left(\frac{A_o'}{B_o'}\right)$ |
| 3 | + | − | $A_o'-$ | $90° + \tan^{-1}\left(\frac{A_o'}{B_o'}\right)$ |
| 4 | − | − | $B_o'+$ | $180° - \tan^{-1}\left(\frac{B_o'}{A_o'}\right)$ |
| 5 | − | − | $B_o'-$ | $180° + \tan^{-1}\left(\frac{B_o'}{A_o'}\right)$ |
| 6 | − | + | $A_o'-$ | $270° - \tan^{-1}\left(\frac{A_o'}{B_o'}\right)$ |
| 7 | − | + | $A_o'+$ | $270° + \tan^{-1}\left(\frac{A_o'}{B_o'}\right)$ |
| 8 | + | + | $B_o'-$ | $0° - \tan^{-1}\left(\frac{B_o'}{A_o'}\right)$ |

TABLE III

| Octant | $A_o'$ Polarity | $B_o'$ Polarity | Magnitude Relation | Correction Required |
|---|---|---|---|---|
| 1 | + | + | $|A_o'| > |B_o'|$ | None |
| 2 | + | + | $|B_o'| > |A_o'|$ | $90° - \tan^{-1}\left(\frac{A_o'}{B_o'}\right)$ |
| 3 | − | + | $|B_o'| > |A_o'|$ | $90° + \tan^{-1}\left(\frac{A_o'}{B_o'}\right)$ |
| 4 | − | 30 | $|A_o'| > |B_o'|$ | $180° - \tan^{-1}\left(\frac{B_o'}{A_o'}\right)$ |
| 5 | − | − | $|A_o'| > |B_o'|$ | $180° + \tan^{-1}\left(\frac{B_o'}{A_o'}\right)$ |
| 6 | − | − | $|B_o'| > |A_o'|$ | $270° - \tan^{-1}\left(\frac{A_o'}{B_o'}\right)$ |
| 7 | + | − | $|B_o'| > |A_o'|$ | $270° + \tan^{-1}\left(\frac{A_o'}{B_o'}\right)$ |
| 8 | + | − | $|A_o'| > |B_o'|$ | $0° - \tan^{-1}\left(\frac{B_o'}{A_o'}\right)$ |

In using the octant selection method shown in Table II, connections 25 and 26 are required to provide logic 21 with the $A_o'$ and $B_o'$ samples. Logic 21 performs the addition and subtraction of $A_o'$ and $B_o'$ to form the $A_o' + B_o'$ quantities which are then examined for polarity information. Testing of the MSB itself gives the polarity information.

In using the octant selection method shown in Table III, connection 25 and 26 and also 27 and 28 are required. Connections 27 and 28 provide the comparitive magnitude relationship of $A_o'$ and $B_o'$ to enable Logic 21 to apply the desired correction indicated to phase angle $\Phi$. For example, a phase angle in the 5th octant has a negative $A_o'$ and $B_o'$, and also $|A_o'| > |B_o'|$. This means that logic 21 must add the digital word representing 180° (see Table I) to the phase angle $\Phi$ to obtain the desired phase angle $\theta_k$. If the method shown in

TABLE I

| Bit Character | $T_1$ | $T_2$ | $T_3$ | $T_4$ | $T_5$ | $T_6$ | $T_7$ | $T_8$ |
|---|---|---|---|---|---|---|---|---|
| Angle(degrees) | 180 | 90 | 45 | 22.5 | 11.25 | 5.625 | 2.8125 | 1.406 |

Table II is used instead for this same angle, then $A_o' + B_o'$ and $A_o' - B_o'$ are found to be negative and $A_o'$ and $B_o'$ are negative, indicating that the angle is in the 5th octant and that the correction required is $180° + \Phi$.

At the output of logic circuit 21 appears signal 24 having the form:

$$\omega_c tk + \theta_k,$$

where $\omega_c$ is the angular carrier frequency (in radians/-seconds), $\theta_k$ is the modulated phase angle (radians), (defined previously as $\gamma(t) + \alpha(t)$), $k$ is the operator which represents the sampling instant (and is dimensionless), and $t$ is time (in seconds).

Once signal 24 is formed, the phase angle $\theta_k$ and thus the encoded data may be readily extracted by a number of means well known in the art. In coherent multiphase systems all that remains is to subtract the fixed phase reference $\omega_c t$. By definition of coherent operation, the phase reference is known (or may be easily determined at the receiver by phase detection circuits) and the phase angle may be extracted by digital subtraction. Once the phase angle is known the data may be readily decoded. (Refer to the Bennet and Davey reference, Chapter 13, mentioned above for a discussion of subtraction of the coherent carrier signal.)

In noncoherent systems (differential operation), the phase angle of interest is contained in the difference between successive phase angle samples, i.e., $\theta_k - \theta_{k-1}$. Digital delay register 22 provides the one symbol delay period required to permit the phase difference to be formed by a subtraction of two successive symbols in binary adder 23. At the output of delay circuit 22 appears $\omega_c t(k-1) + \theta_{k-1}$. By subtracting this signal from the $k^{th}$ sample, $\omega_c tk + \theta_k$ in binary adder 23, the resultant $\omega_c t + (\theta_k - \theta_{k-1})$ is formed. Since $\omega_c t$ is a fixed number of radians, it can be represented by a fixed digital word for all samples and subtracted out in the same manner as $\theta_k - \theta_{k-1}$ is formed by circuit 23. In FIG. 2, $\theta(t)$ is shown to be the output of binary adder 23. $\theta(t)$ is a parallel eight-bit digital word representing the phase-coded tribits as per the coding of FIG. 1B and Table I. A number of methods are available which would provide the decoding of tribits from the phase angle $\theta(t)$.

The use of a read-only memory device in the demodulation process, as described, is a desirable feature since it reduces the cost and complexity of the prior art. Multiple use of such devices, however, should be avoided from cost considerations. Read-only memories introduce nonlinear error distortion which is caused by the digital translation. This type of distortion is similar to the quantizing error introducing by analog-to-digital converters. Analog-to-digital conversion involves sampling an analog signal at particular intervals and converting the sampled signals to a corresponding digital signal having a fixed number of bits. The quantizing error is inherent in this encoding process because the digital signal having a fixed number of bits is only capable of representing a discrete number of amplitude levels while the analog signal has a continuous range of amplitudes. A read-only memory transformation has a similar quantizing error even though there is no quantizing of an analog signal as in the A/D converter. The use of several read-only memory devices in the signal path should be avoided since quantizing errors are accumulative.

Figure 3:
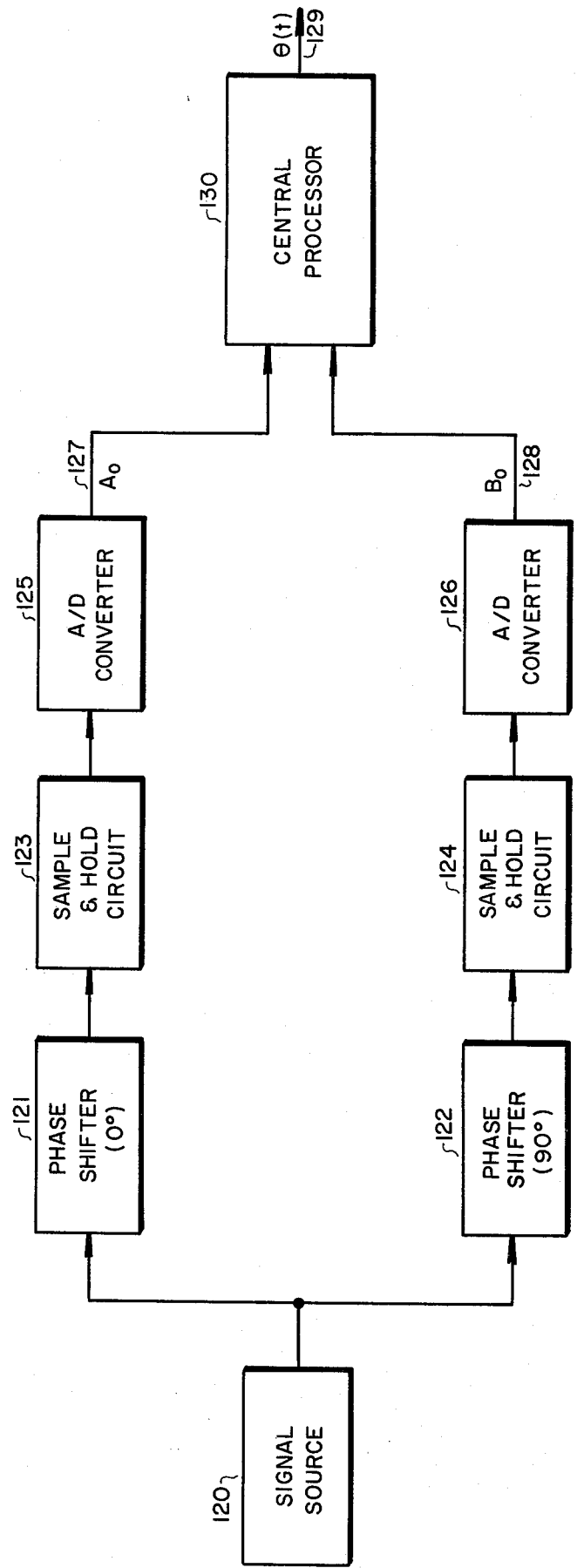
FIG. 3 is a block diagram of another emodiment of this invention, using a central processor (special-purpose computer).

FIG. 3 indicates a block diagram of an alternative embodiment of this invention. In comparing the apparatus in FIGS. 2 and 3, it is evident that the signal processing is the same to the point of digitization of the analog quadrature components. Signal source 120 is assumed to produce the same eight-phase phase modulated carrier $X(t)$ as before. The input signal 131 is split into its quadrature components (by phase shifters 121 and 122) and then digitized (by converters 125 and 126) into the same parallel eight-bit binary word as before. The central processing unit 130 used in this embodiment performs the functions which were performed previously in circuits 19 through 23. Relatively inexpensive CPUs could be used to implement CPU 130 (in a four-phase system) such as the type manufactured by Intel Corporation, part no. 8080 or 4004 or of the type manufactured by National Semiconductor Corporation, part no. IMP-MMM 5751 or MM 5750. A system using eight-phase modulation requires greater speed than that which is currently available and, therefore, some form of integrated logic circuitry would be required to implement the CPU function. The particular implementation of a processor used herein for eight-phase operation is explained below in conjunction with FIGS. 5 and 6.

Figure 4A:
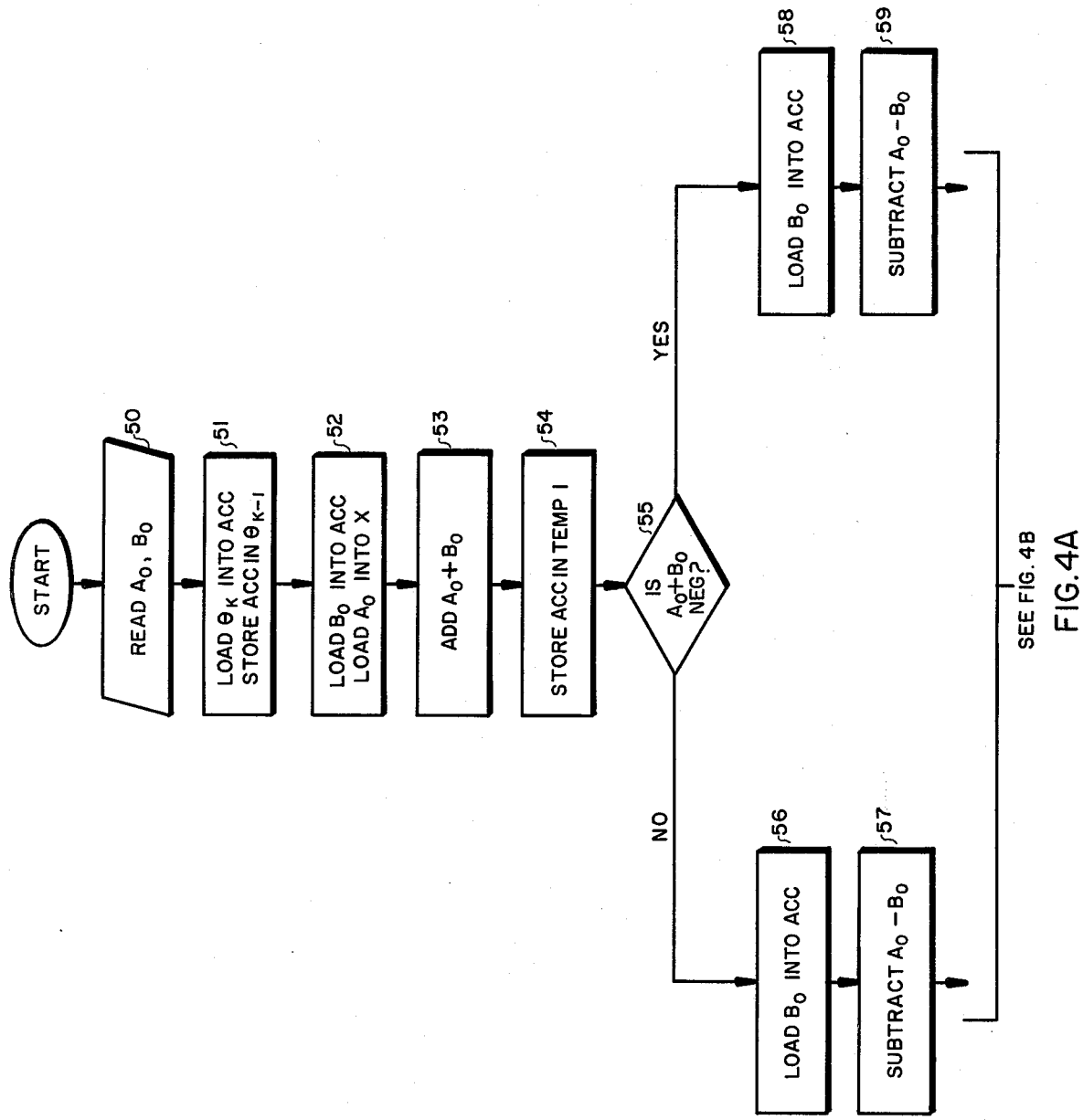
FIGS. 4A, 4B, and 4C comprise a functional flow diagram which illustrates the process implemented by the central processor of FIG. 3.
Figure 4B:
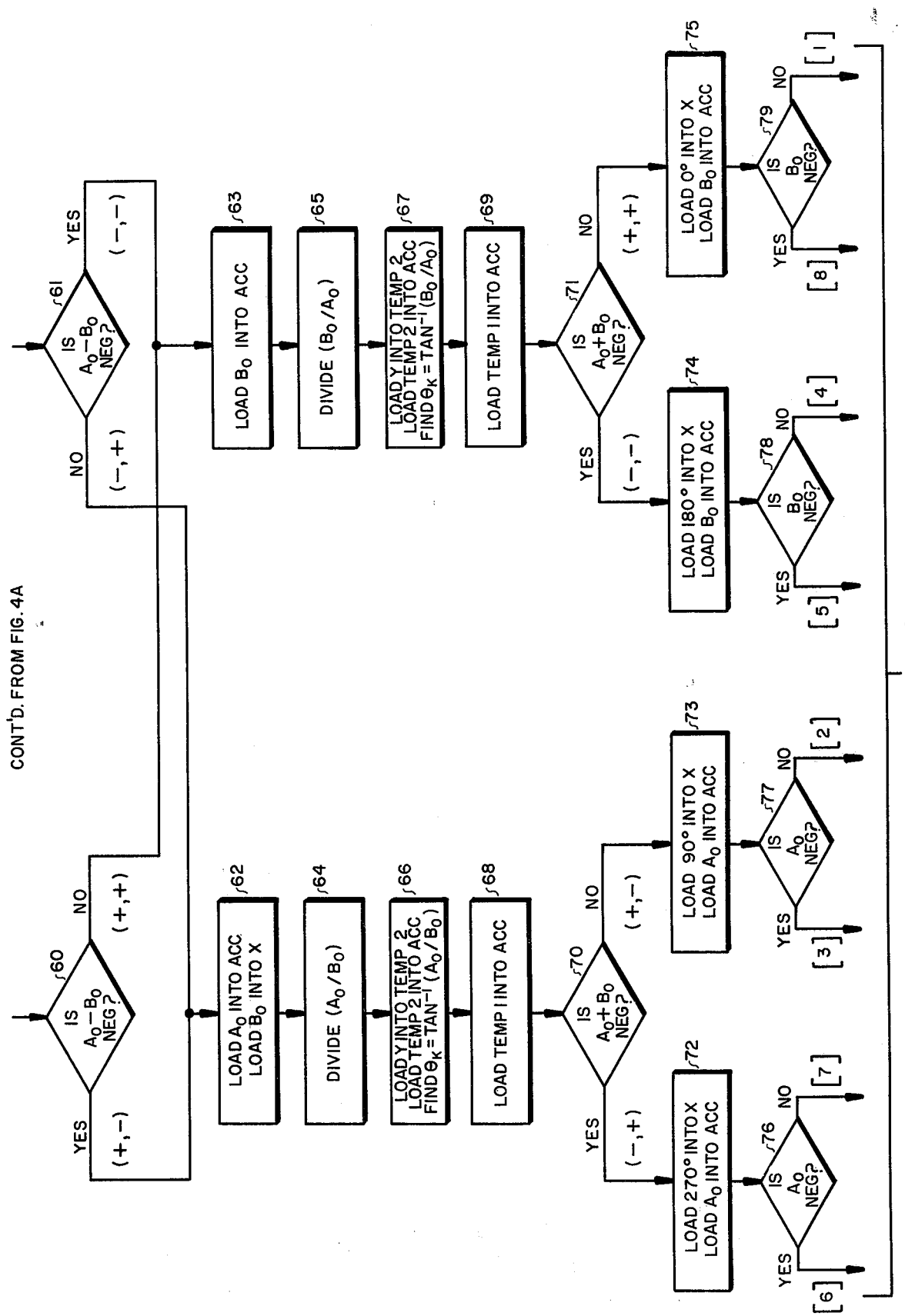
Figure 4C:
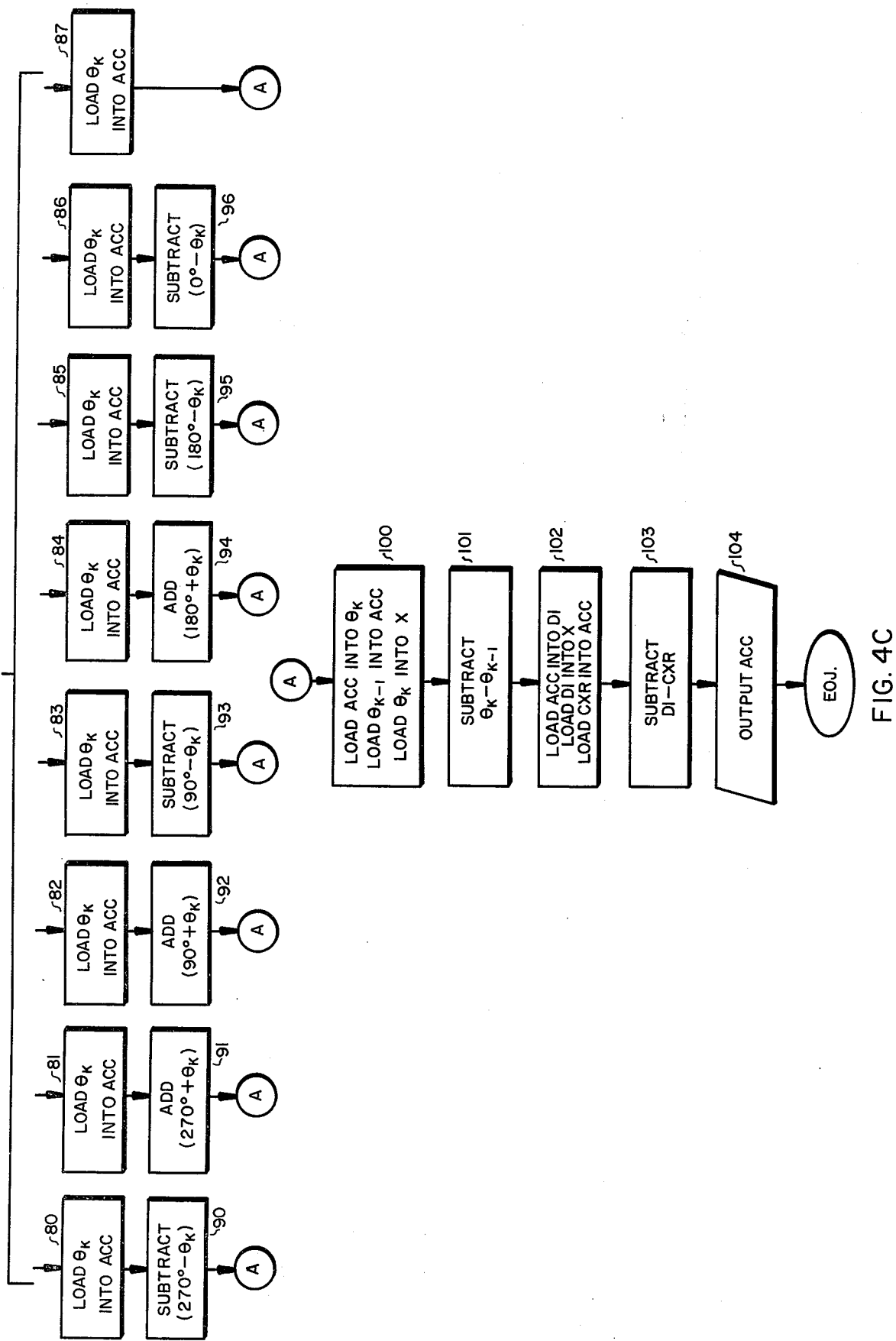

Referring to FIGS. 4A, 4B, and 4C, the flow diagram shown illustrates the process performed by the CPU 130 in FIG. 3. Initial step 50 reads the unequalized input samples $A_o$ and $B_o$ (on lines 127 and 128 in FIG. 3) into the CPU memory, which will be referred to as memory locations $A_o$ and $B_o$. Although not shown, the program could perform digital equalization of the quadrature samples of a type described to "An Adaptive Mean Square Equalizer," International Conference on Communications p. 9F (I.E.E.E., Inc. 1974). Block 51 is used in conjunction with step 100 and will be discussed later. Memory locations $B_o$ and $A_o$ are loaded into the accumulator (ACC) and X registers at 52 for the addition sequence at step 53. At 54, the sum $A_o + B_o$ is stored in memory location TEMP 1. Decision block 55 tests the sum $(A_o + B_o)$ to determine polarity. If $(A_o + B_o)$ is negative, the YES path is taken, and if the sum is positive, the NO path is taken. The decision is made in conjunction with the decision at 60 and 61 to enable either $A_o/B_o$ or $B_o/A_o$ to be formed so that the quotient is less than or equal to 1. The NO path from 55 proceeds to place $B_o$ in the accumulator at 56 so that $B_o$ may be subtracted from $A_o$ at 57. The same process is performed at 58 and 59 if $A_o + B_o$ is negative. At decision blocks 60 and 61 the difference $(A_o - B_o)$ is tested for polarity. The bracketed + and − notations indicate the relative polarity of the $A_o \pm B_o$ quantities which have in effect been determined by 55 and 60 or 55 and 61. The YES path at decision block 60 and the NO path from decision block 61 are taken if $B_o$ is larger than $A_o$ to form the $A_o/B_o$ quotient. And likewise, the NO path from decision block 60 and the YES path from decision block 61 are taken if $A_o$ is larger than $B_o$ to form the $B_o/A_o$ quotient.

Figure 5:
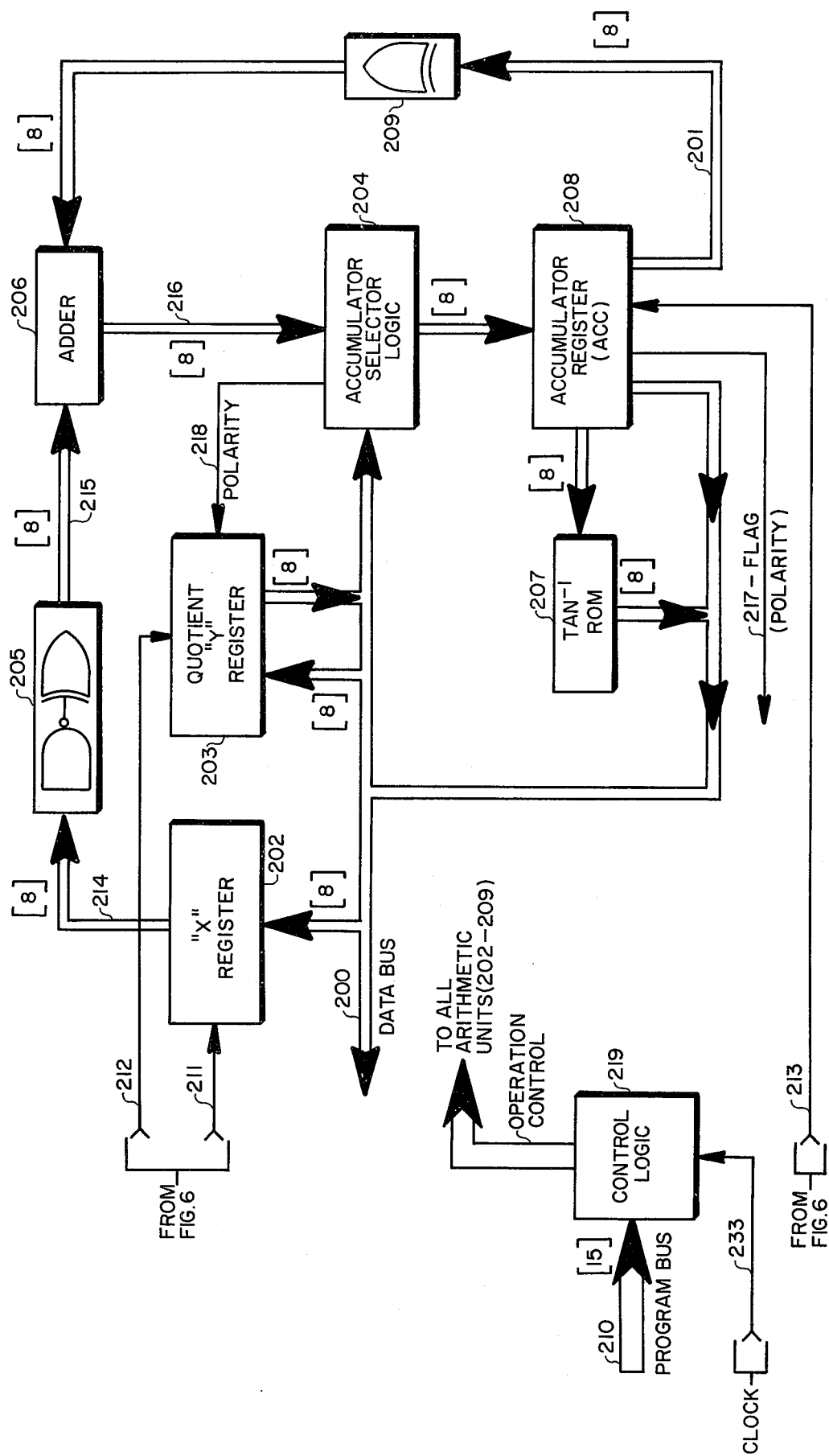
FIG. 5 is a block diagram of the arithmetic portion of the central processor of FIG. 3.

As will be explained in more detail subsequently, the processor 130 in FIG. 3 consists of a controller shown in FIG. 6 and an arithmetic unit shown in FIG. 5. The arithmetic unit has three main registers: the X register, the Y register, and the accumulator register. Since division is performed in the following sequence: ACC/X = Y, $A_o$ is placed in the accumulator register and $B_o$ into the X register at 62 with division being performed at 64. The quotient, which appears in the Y register, is placed in memory location TEMP 2 at 66 and then put in the accumulator register for the look-up table process. The phase angle which represents $$\tan^{-1}\left(\frac{A_o}{B_o}\right)$$

is placed in memory position $\theta_k$. Memory location "TEMP 1" ($A_o + B_o$) is placed in the accumulator register at 68.

The same process (as performed at 62, 64, 66, and 68) is performed at 63, 65, 67, and 69 for the signal condition of $A_o > B_o$. At decision blocks 70 and 71, the sum ($A_o + B_o$) is again tested for polarity. If $A_o + B_o$ is negative at 70, then the correct octant in which $\theta_k$ is located is either the 6th or 7th octant. If $A_o + B_o$ is positive at 70, then $\theta_k$ is in either the 2nd or 3rd octant. Similarly, at 71, if $A_o + B_o$ is negative, then $\theta_k$ is in either the 4th or 5th octant. If the sum is positive at 71, then $\theta_k$ lies in the 1st or 8th octant. This fact allows either 0°, 90°, 180° or 270° to be loaded into the X register at 72, 73, 74 or 75 for the addition to or subtraction from the $\theta_k$ found at 66 or 67. At decision blocks 76, 77, 78, and 79, the polarity of $A_o$ (76, 77) or $B_o$ (78 and 79) is tested. By testing the polarity of these signals, the exact octant in which the $\theta_k$ angle is located may be exactly determined (refer to column 4, Table II). And consequently the correction required may be applied to this phase angle. Referring to Table II, column 4, FIG. 4B and FIG. 4C, if $A_o$ is negative, the YES path from decision block 76 is taken the correction applied to $\theta_k$ at 80 and 90 places $\theta_k$ in the 6th octant. If $A_o$ is positive however, then $\theta_k$ must be in the 7th octant, and the sum (270° + $\theta_k$) is formed at 81 and 91. The same type of tests are applied at decision blocks 77, 78, and 79 to form the proper correction required. The process blocks having numbers in the 80 series in FIG. 4C place the phase angle $\theta_k$ in the accumulator register so that the proper correction can be applied at process blocks 90 – 96. At steps 100 and 101, the difference between two successive phase samples is taken. This corresponds to the process performed by blocks 22 and 23 in FIG. 2. Step 51 is needed in conjunction with steps 100 and 101 so that the previous phase sample may be stored at $\theta_{k-1}$. This assumes that the proper arithmetic registers are subtracted from each other to obtain the correct phase difference. In a coherent multiphase system, clearly steps 51, 100, and 101 would not be required. At step 102, the difference is placed in memory location D1 and in the X register, and the known carrier (represented by a fixed digital word) is placed in the accumulator position. Step 103 subtracts the phase angle and the carrier to eliminate the carrier term from the desired phase angle. At 104, the accumulator register which now represents $\theta(t)$ is read out of the processor. This process would then be repeated successively for each new $A_o$ and $B_o$ samples taken.

To illustrate the method of angle calculation, assume that the angle $\theta_k$ is 30°. The $A_o$ and $B_o$ samples are read into the processor and then the previous $\theta_k$ calculated is shifted to the $\theta_{k-1}$ position in memory. Now $A_o = r(t)$ cos 30°, $B_o = r(t)$ sin 30°, and $r(t)$ in a typical low noise environment is a time-varying envelope term that is greater than 0 at the sampling instant. Therefore the sum of ($A_o + B_o$) at 55 will be greater than 0. (The polarity bit will be 0, indicating a positive $A_o + B_o$ sum.) The sum is stored in memory position TEMP 1 for later use and $A_o + B_o$ is tested to determine whether the polarity is positive or negative. Then at 57 the difference ($A_o - B_o$) is formed, and its polarity is tested at 60. Since $r(t) \cos 30° - r(t) \sin 30° = r(t) (0.866 - 0.5) = r(t) (0.366)$ is a positive number and since $A_o + B_o$ is positive, the phase angle is either in the first or the eighth octants. In either octant, $B_o \leq A_o$, and the division path to be followed (63, 65, 67, and 69) forms $B_o/A_o = Y$. The quotient register y is loaded into the accumulator register by temporarily placing the quotient in memory location TEMP 2 and then back into the accumulator register. (The contents of the Y register cannot be placed directly in the ACC register with this processor configuration.) Then the $TAN^{-1}$ portion of the data ROM is addressed by the accumulator. The output of the data ROM is $$TAN^{-1}\left(\frac{B_o}{A_o}\right)$$

and this is read into memory position $\theta_k$. The sum ($A_o + B_o$) is tested again to determine whether the division was performed for an angle in the 1st or 8th octants or the 4th or 5th octants; since the sum is positive, the angle lies in either the 1st or 8th octant. The next step is to distinguish between the first or the 8th octants. Since the polarity of the sine function changes between the 8th and the 1st octant, $B_o$ is tested ($B_o$ is the sine function). The sin 30° is positive, indicating that $\theta_k$ is in the 1st octant, and no correction is needed. For this reason, there is no process block numbered 97 in FIG. 4C.

As a second example, let $\theta_k = 240°$, which lies in the 6th octant. As before, the $A_o$ and $B_o$ quadrative samples are read into the processor, and the previously calculated $\theta_k$ is shifted to the $\theta_{k-1}$ position in memory. This shifting step is performed so that the phase difference can be formed at step 101.

The sum $(A_o + B_o) = r(t) \cdot (\cos 240° + \sin 240°) = r(t) (-0.5 -0.866)$. This number is stored in memory location TEMP 1 and is clearly a negative number so that the YES path from 55 is taken. $A_o - B_o$ is next formed at 59 as $r(t) (-0.5 + 0.866) =$ a positive number indicating $A_o$ is smaller in magnitude than $B_o$. As before, $A_o/B_o$ is applied to the ROM look-up table at 66, and the quotient is placed in memory position $\theta_k$. The sum ($A_o + B_o$) is tested at 70 to determine whether the division was performed for the 6th or 7th octant or the 2nd or 3rd octant. $A_o + B_o$ is negative and therefore $\theta_k$ is in either the 6th or 7th octant. The cosine changes polarity between the 6th and 7th octant, and therefore $A_o$ is tested at 76 to determine that octant 6 contains the particular phase angle. The $\theta_k$ formed at 76 is subtracted from 270° at step 90 in FIG. 4C to form the corrected angle. This corrected phase angle (240°) is placed in $\theta_k$ and represents the particular transmitted phase in binary form for the particular $k^{th}$ sample. Again, since the information desired is in the difference of two samples, the subtraction of two successive phases (at steps 101 and 103 in FIG. 4C) must be formed.

There are any number of ways in which this digital process outlined above could be implemented on a programmed machine. The preferred implementation uses the digital processor 130, shown in FIG. 3. The central processor 130 is shown more fully in FIGS. 5 and 6. These two FIGS. 5 and 6 diagrammatically show a stored programmed computer which is capable of performing the angle calculation of FIG. 4A, B, and C. Reference is made to the following texts for fundamentals of computer organization and operation.

Particular reference is made to chapters 2, 4, 6, and 7 of Introduction to Computer Organization and Data Structures by H. S. Stone (McGraw Hill, Inc. 1972).

Chapter 12 of Digital Computer Design Fundamentals by Y. Chu (McGraw Hill Book Company, Inc., 1962) discusses in detail the arithmetic and control units for a typical stored program digital computer.

Design of Digital Computers by H. W. Gschwind (Springer - Verlag, 1967) and Minicomputers for Engineers and Scientists by G. E. Korn (McGraw Hill Book Company, 1973) are also good references in this area.

In general, at least two arithmetic registers are required for addition and subtraction, and at least three registers for multiplication and division. The arithmetic unit shown in FIG. 5 consists of three main registers: the X register 202, the quotient (or Y) register 203, and the accumulator (ACC) register 208. These registers are used in conjunction with adder 206 and the associated logic 205, 209, and 204 to perform the functions required for the angle calculations. Functionally the control logic unit 219 accepts the programmed instructions via the program data bus 210 having a digital word length of 15 bits. Logic 219 decodes the programmed instructions into logic levels and timing pulses which gate the digital words between the various registers and determine the function performed by the arithmetic circuits. The logic levels and timing pulses are connected to the various arithmetic circuits via the control leads labelled "Operation Control". The data bus 200, having an 8 bit word length, connects the arithmetic registers and logic units with the central memory shown in FIG. 6. The inverse tangent ROM 207 is used in conjunction with the ACC register to perform the inverse tangent function required in the angle calculation. Logic unit 205 and 209 are used in conjunction with adder 206 to combine digital words from two of the three registers available to actually perform the addition, subtraction and division on a bit-by-bit basis. The two's complement notation and the signal magnitude notation, which are commonly used for arithmetic functions, are both used by the arithmetic unit shown in FIG. 5. The various register operations performed by the arithmetic unit and the order in which they are performed are as follows:

$$ACC + X = ACC$$

$$X - ACC = ACC$$

$$ACC/X = Y$$

Very briefly, these arithmetic operations are performed by the circuits in FIG. 5 in the following steps. To add, the programmed instruction giving that command enters via program bus 210 to control logic 219, which translates the command instruction into logic signals and timing pulses. In a clock-timed step process, the contents of the X register 202 are sent via data bus 214 through combinational logic circuits 205. Logic circuits 205 consist of 8 circuits identical to the one indicated by 205 in FIG. 5. Since all digital words are in parallel form. Logic 205 passes the X register signal through to adder 206 unaffected. The contents of the accumulator (ACC) register 208 is similarly clocked through logic circuits 209, and transferred to adder 206 unaffected. The bit-by-bit addition is performed in adder 206 with the result appearing in the ACC register 208 through the accumulator selector logic 204.

Subtraction is performed by a similar process, except that logic circuits 209 invert the contents of the ACC register so that adder 206 performs a two's complement subtraction of the contents of the X and ACC registers. Control logic 219 ensures that the proper logic operation is performed on the data, determined by the number representation, i.e., signed magnitude or two's complement.

Division is performed using a right-to-left shifting process of the contents of the ACC register and by successively subtracting the X register contents 211 from the ACC register contents 213. The quotient is collected in the quotient register 203 via connection 218, one bit at a time. Lines 211, 212, and 213 are register enable leads from the register selector 227 located on the controller, FIG. 6. The register selector 227 enables the ACC, X, or Y register to either extract data from or place data onto the data bus 200.

Figure 6:
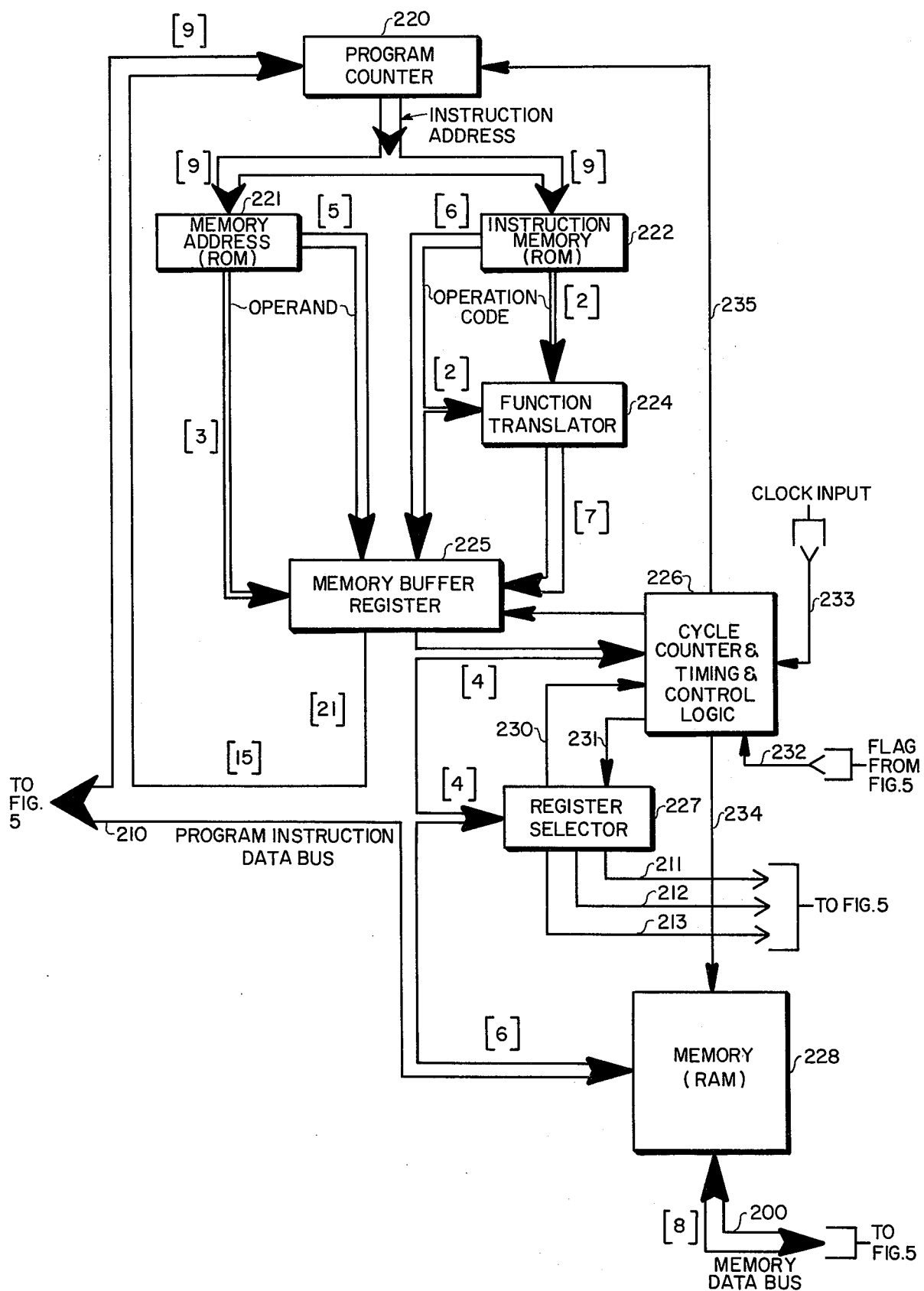
FIG. 6 is a block diagram of the controller of the central processor of FIG. 3.

The controller section of the processor shown in FIG. 6 governs the operation of the complete processor system. It initiates the execution of an operation and it controls the sequence of each operation. The controller stores the fixed program of operations given below and translates these operations into a form which the Arithmetic units in FIG. 5 can use to perform the actual calculations. The controller is composed of counters 220 and 226 (226 is also a logic unit), memories 221, 222, and 228, and register unit 225 and register selector logic 227. The functional operation of each of these items may be found in the four computer texts referred to above. The numbers in parentheses adjacent to each data bus, as in FIG. 5, refers to the bit word length. Central memory 228 is a random-access memory (RAM). The RAM contains 64 randomly accessible positions having a word length of 8 bits. All functions may be constructed with standard semiconductor logic devices. The stored program of instructions is contained in a pair of read-only memories 221 and 222, each containing 512 memory locations. Each memory location contains two 8-bit words and is accessed with a 9-bit address.

The processor has the capability of performing various functions. The functions necessary for the phase angle detection are as follows: Read-write instructions, conditional jump instructions, and arithmetic instructions. The various instructions and their octal representation are given below to assist in understanding the programmed operations which are detailed also below.

The read-write instructions consist of three operations: Read OPERAND, Read Memory, and Write Memory. The Read Operand instruction takes the fixed word stored in memory ROM 221 and places it into either the ACC register, X register or the Y register. On the first line, the 0 4 0 number represents the operation code and the X X X represents the Operand code determined by the program.

| | | |
|---|---|---|
| OP → ACC | 040 XXX | Read operand into ACC |
| OP → X | 041 XXX | Read operand into X |

| | | |
|---|---|---|
| OP → Y | 042 XXX | Read operand into Y |

The read-memory instruction takes the contents of RAM 228 at address MEM and places it into either the ACC register, X register, or Y register. This instruction does not alter the contents of MEM. A listing of the read-memory instructions, their meaning, and the octal word structure follows.

| | | |
|---|---|---|
| MEM → ACC | 020 MEM | Read memory "MEM" into ACC |
| MEM → X | 021 MEM | Read memory "MEM" into X |
| MEM → Y | 022 MEM | Read Memory "MEM" into Y |
| MEM → RCV REG | 031 MEM | Read D1 memory location out |

The write-memory instruction takes the contents of the designated register and transfers it to the random-access memory location 228, designated by MEM. The registers that may be accessed by this instruction are the ACC register and Y register. The two analog-to-digital converters 125 and 126 in FIG. 3 (refer red to below as A/D1 and A/D2) can be placed in memory (MEM). The TAN$^{-1}$ ROM output can be sent to memory MEM and the three most significant bits of the accumulator can also be placed in memory using the "write-memory instruction". And, as before, the write-memory instruction does not alter the contents of the accessed registers. A listing of the write-memory instructions, their meaning and the octal word structure follows.

| | | |
|---|---|---|
| ACC → MEM | 000 MEM | Write ACC into "MEM" |
| Y → MEM | 002 MEM | Write Y into "MEM" |
| DATA → MEM | 005 MEM | Write DATA into "MEM" |
| A/D1 → MEM | 006 MEM | Write A/D1 into "MEM" |
| A/D2 → MEM | 007 MEM | Write A/D2 into "MEM" |

The jump instructions are used to cause the program counter 220 to alter its contents to the required state if the most significant bit of the ACC register 208 is one. This has the effect of causing a program jump if the contents of the accumulator register 208 are negative. If the contents are not negative, no jump results. A listing of the two jump instructions and their octal word structure follows.

JUMP UNCONDITIONAL: This instruction causes the program counter 220 to be set to the jump destination indicated by the XXX bits. The instruction and the octal code for this (112 XXX).

JUMP ON COMMAND (JOC): This instruction tests the most significant bit of the accumultor register, and if negative, a jump occurs to the program step address, indicated by the XXX bits. The instruction and the octal code for this is (111 XXX).

the arithmetic instructions consist of addition, subtraction, and division. The additions and subtractions may be performed either in signed magnitude or two's complement number representations. The instructions and the octal code for each are listed below.

ADD (Signed magnitude): This instruction causes the signed magnitude number in the X register to be added to the signed magnitude number in the accumulator, with the sum appearing in the accumulator and in signed magnitude. The octal code which creates this instruction is (374 073).

SUB (Subtraction signed magnitude): This instruction causes the signed magnitude number in the accumulator to be subtracted from the signed magnitude number in the X register, with the difference appearing in the accumulator. The octal code which creates this instruction is (374 033).

TAD (Add, 2's complement): This instruction takes the 2's complement number in the X register, adds it to the 2's complement number in the accumulator. The octal code which creates this instruction is (375 061).

TSU (Subtract, 2's complement): This instruction takes the 2's complement number in the accumulator and subtracts it from the 2's complement number in the X register. The difference is loaded into the accumulator. The octal code which creates this instruction is (375 025).

DIVIDE (Absolute value division): This instruction divides the signed magnitude number in the accumulator by the signed magnitude number in the X register, with the result unsigned quotient appearing in Y, and the octal code which creates this instruction is (350 160).

The program below is listed with the program step followed by the octal address, the Operand word, and followed by a mnemonic describing the operation. It should also be remembered that any equalization of the line signals should be accomplished by the program before the angle calculation is initiated.

| | | |
|---|---|---|
| 1 | 006 363 | Read $A_o$ |
| 2 | 007 373 | Read $B_o$ |
| 3 | 020 341 | $\theta_k$ INTO Acc |
| 4 | 000 342 | Acc INTO $\theta_{k-1}$ |
| 5 | 020 373 | $B_o$ INTO Acc |
| 6 | 021 363 | $A_o$ INTO X |
| 7 | 374 073 | ADD |
| 10 | 000 307 | Acc INTO TEMP 1 |
| 11 | 111 045 | JOC (MSB=1) to 45 (Jump to step 45) |
| 12 | 020 373 | $B_o$ INTO Acc |
| 13 | 374 033 | SUB |
| 14 | 111 050 | (MSB=1) to 050 (Jump to step 50) |
| 15 | 020 373 | $B_o$ INTO ACC |
| 16 | 350 160 | DIVIDE |
| 17 | 002 343 | Y INTO TEMP 2 |
| 20 | 020 343 | TEMP 2 INTO Acc |
| 21 | 005 341 | RTB INTO $\theta_k$ (Read data look-up table into $\theta_k$) |
| 22 | 005 341 | RTB INTO $\theta_k$* |
| 23 | 020 307 | TEMP 1 INTO Acc |
| 24 | 111 034 | JOC (MSB=1) to 034 |
| 25 | 041 000 | RDO INTO X (0°) (Read operand into x) |
| 26 | 020 373 | $B_o$ INTO Acc |
| 27 | 111 031 | JOC (MSB=1) to 31 |
| 30 | 112 103 | JUMP TO 103 |
| 31 | 020 341 | $\theta_k$ INTO Acc |
| 32 | 375 025 | TSU |
| 33 | 112 102 | JUMP TO 102 |
| 34 | 041 200 | RDO INTO X (180°) |
| 35 | 020 373 | $B_o$ INTO Acc |
| 36 | 111 042 | JOC (MSB=1) TO 42 |
| 37 | 020 341 | $\theta_k$ INTO Acc |
| 40 | 375 025 | TSU |
| 41 | 112 102 | JUMP TO 102 |
| 42 | 020 341 | $\theta_k$ INTO Acc |
| 43 | 375 061 | TAD |
| 44 | 112 102 | JUMP TO 102 |
| 45 | 020 373 | $B_o$ INTO Acc |
| 46 | 374 033 | SUB |
| 47 | 111 015 | JOB (MSB=1) TO 15 |
| 50 | 020 363 | $A_o$ INTO Acc |
| 51 | 021 373 | $B_o$ INTO X |
| 52 | 350 160 | DIVIDE |
| 53 | 002 343 | Y INTO TEMP 2 |
| 54 | 020 343 | TEMP 2 INTO Acc |
| 55 | 005 341 | RTB INTO $\theta_k$ |
| 56 | 005 341 | RTB INTO $\theta_k$ |
| 57 | 020 307 | TEMP 1 INTO Acc |
| 60 | 111 072 | JOC (MSB=1) TO 72 |
| 61 | 041 100 | RDO INTO X (90°) |

-continued

| | | |
|---|---|---|
| 62 | 020 363 | $A_o$ INTO Acc |
| 63 | 111 067 | JOC (MSB=1) TO 67 |
| 64 | 020 341 | $\theta_k$ INTO Acc |
| 65 | 375 025 | TSU |
| 66 | 112 102 | JUMP TO 102 |
| 67 | 020 341 | $\theta_k$ INTO Acc |
| 70 | 375 061 | TAD |
| 71 | 112 102 | JUMP TO 102 |
| 72 | 041 300 | RDO INTO X (270°) |
| 73 | 020 363 | $A_o$ INTO Acc |
| 74 | 111 100 | JOC (MSB=1) TO 100 |
| 75 | 020 341 | $\theta_k$ INTO Acc |
| 76 | 375 061 | TAD |
| 77 | 112 102 | JUMP TO 102 |
| 100 | 020 341 | $\theta_k$ INTO Acc |
| 101 | 375 025 | TSU |
| 102 | 000 341 | Acc INTO $\theta_k$ |
| 103 | 021 341 | $\theta_k$ INTO X |
| 104 | 020 342 | $\theta_{k-1}$ INTO Acc |
| 105 | 375 025 | TSU |
| 106 | 000 344 | Acc INTO D1 |
| 107 | 031 344 | Read D1 RCV REG (Read D1 out of processor) |

*Step 17/55 requires twice the time interval to perform the data look-up process due to the propagation delay of the ROM.

What is claimed is:

1. A digital phase detector which periodically detects the phase angle $\theta_k$ of a carrier signal in which data are encoded as discrete phase changes, said detector comprising:
   means responsive to said carrier signal for separating said carrier signal into its in-phase and quadrature-phase signal components $R_o \cos \theta(t)$ and $R_o \sin \theta(t)$;
   means for converting said signal components $R_o \cos \theta(t)$ and $R_o \sin \theta(t)$ at predetermined modulation intervals, into encoded binary signals $R_o \cos \theta_k$ and $R_o \sin \theta_k$;
   means responsive to said binary signals for forming said phase angle $\theta_k$ that is proportional to the encoded data, said forming means comprising:
   dividing means responsive to said binary signals $R_o \cos \theta_k$ and $R_o \sin \theta_k$ for digitally forming the quotient $\Psi$ of said binary signals, such that $|\Psi| \leq 1$;
   data look-up means for digitally forming a reference angle signal $\Phi$ such that $\Phi = \tan^{-1} \Psi$; and
   logic means for modifying the reference signal $\Phi$ to be the phase angle $\theta_k$, said modification being determined by said binary signals $R_o \cos \theta_k$ and $R_o \sin \theta_k$.

2. A digital phase detector according to claim 1, wherein said forming means comprises a special-purpose stored program computer programmed for the calculation of $\theta_k$ from said binary signals $R_o \cos \theta_k$ and $R_o \sin \theta_k$.

3. A digital phase detector according to claim 2, wherein said separating means further comprises a wideband 90° phase shifting filter.

4. A digital phase detector according to claim 3, wherein the means for converting said $R_o \cos \theta(t)$ and $R_o \sin \theta(t)$ signal into binary signals $R_o \cos \theta_k$ and $R_o \sin \theta_k$ further comprises analog-to-digital converters.

5. A digital phase detector accordin to claim 4, wherein said logic means operates according to the polarity of $R_o \cos \theta_k + R_o \sin \theta_k$, $R_o \cos \theta_k - R_o \sin \theta_k$, $R_o \cos \theta_k$, and $R_o \sin \theta_k$.

6. A digital phase detector according to claim 4, wherein said logic means operates according to the magnitude and polarity of said binary signals $R_o \cos \theta_k$ and $R_o \sin \theta_k$.

7. A digital phase detector according to claim 5, wherein said logic means further comprises digital registers which algebraically combine the reference signal with a selected digital angle to form the corrected phase angle $\theta_k$.

8. A digital phase detector according to claim 7, wherein the data are encoded as the phase difference between the phase $\theta_k$ at the $k^{th}$ modulaton interval, and the phase $\theta_{k-1}$ at the $(k-1)^{th}$ modulation interval.

9. A digital phase detector which periodically detects the phase angle $\theta_k$ of a carrier signal in which data are encoded, said detector comprising:
   means responsive to said carrier signal for separating said carrier signal into its in-phase and quadrature-phase signal components $R_o \cos \theta(t)$ and $R_o \sin \theta(t)$;
   means for converting said signal components $R_o \cos \theta(t)$ and $R_o \sin \theta(t)$ at predetermined modulation intervals into encoded binary signals $R_o \cos \theta_k$ and $R_o \sin \theta_k$;
   dividing means responsive to said binary signals $R_o \cos \theta_k$ and $R_o \sin \theta_k$ for digitally forming the quotient $\Psi$ of said binary signals, such that $|\Psi| \leq 1$;
   data look-up means for digitally forming a reference angle signal $\Phi$ such that $\Phi = \tan^{-1} \Psi$; and
   logic means for modifying the reference signal $\Phi$ to be the phase angle $\theta_k$, said modification being determined by said binary signals $R_o \cos \theta_k$ and $R_o \sin \theta_k$.

10. A digital phase detector according to claim 9, wherein said separating means further comprises a wideband 90° phase shifting filter.

11. A digital phase detector according to claim 10, wherein the means for converting said $R_o \cos \theta(t)$ and $R_o \sin \theta(t)$ signals into binary signals $R_o \cos \theta_k$ and $R_o \sin \theta_k$ further comprises analog-to-digital converters.

12. A digital phase detector according to claim 11, wherein said dividing means further comprises a digital divider network.

13. A digital phase detector according to claim 12, wherein the means forming the reference angle signal $\Phi$ further comprises a data look-up memory device programmed for $\tan^{-1}$ operation for angles equal to or less than 45°.

14. A digital phase detector according to claim 13, wherein the means for modifying said reference angle $\Phi$ operates according to the polarity of $R_o \cos \theta_k + R_o \sin \theta_k$, $R_o \cos \theta_k - R_o \sin \theta_k$, $R_o \cos \theta_k$, and $R_o \sin \theta_k$.

15. A digital phase detector according to claim 13, wherein the logic means for modifying said reference angle $\Phi$ operates according to the magnitude and polarity of said binary signals $R_o \cos \theta_k$ and $R_o \sin \theta_k$.

16. A digital phase detector according to claim 14 wherein the data are encoded as the phase difference between the phase $\theta_k$ at the $k^{th}$ modulation interval, and the phase $\theta_{k-1}$ at the $(k-1)^{th}$ modulaton interval.

17. A method of phase detection which periodicaly detects the phase angle $\theta_k$ of a carrier signal in which data are encoded, said method comprising the steps of:
   splitting said carrier signal into its in-phase and quadrature-phase signal components $R_o \cos \theta(t)$ and $R_o \sin \theta(t)$;
   converting said $R_o \cos \theta(t)$ and $R_o \sin \theta(t)$ at predetermined modulation intervals into encoded binary signals $R_o \cos \theta_k$ and $R_o \sin \theta_k$;
   dividing said binary signals $R_o \cos \theta_k$ and $R_o \sin \theta_k$ to form the quotient $\Psi$ such that $|\Psi| \leq 1$;

digitally translating said quotient $\Psi$ into a reference angle signal $\Phi = \tan^{-1} \Psi$; and digitally correcting said reference signal $\Phi$ to be the phase angle $\theta_k$, said correction being determined by said binary signals $R_o \cos \theta_k$ and $R_o \sin \theta_k$.

* * * * *

UNITED STATES PATENT AND TRADEMARK OFFICE
CERTIFICATE OF CORRECTION

PATENT NO. : 3,956,623
DATED : May 11, 1976
INVENTOR(S) : Thomas E. Clark, Robert J. Tracey, and Ronald J. Violet It is certified that error appears in the above-identified patent and that said Letters Patent are hereby corrected as shown below:

Column 3, line 10, "processingg" should read -- processing --.
Column 4, line 68, in the 2nd equation, the cos and sin should be reversed such that the equation reads:

$$\left| \frac{B_o'}{A_o'} \right| = \left| \frac{R_o \sin(k\omega_c t + \theta_k)}{R_o \cos(k\omega_c t + \theta_k)} \right| = \tan(k\omega_c t + \theta_k).$$

Column 5, line 25, after "$\tan^{-1} \tan(k\omega_c t + \theta_k)$" and before the period -- $= k\omega_c t + \theta_k$ -- should be included; same column 5, line 26, after "quotient is" the word -- formed -- should be inserted; same column 5, line 28, the angle value should read -- $90° - (k\omega_c t + \theta_k)$ --; same column 5, line 42, after "less than one", a comma should be inserted; same column 5, line 43, the symbol $\Phi$ should be deleted before "ROM 20" and be inserted after "output" to read -- The output $\Phi$ of ROM 20 --. Column 6, Table III, line 33, under the "$B_o'$ Polarity" column, "30" should read -- + --; same column 6, lines 46/47, "$A_o' + B_o'$" should read -- $A_o' \pm B_o'$ --. Column 8, line 20, "IMP-MMM 5751" should read -- IMP-MM 5751--; same column 8, line 65, one of the two colons should be omitted after "registers". Column 10, line 43, after " = r(t)" the period should be deleted. Column 12, line 39, "parentheses" should read -- brackets --. Column 14, line 28, "bya" should read -- by a --. Claim 1, column 15, line 24, "as discrete phase changes" should be deleted; same claim 1, line 32, "$R_o \cos \theta hd k$" should read -- $R_o \cos \theta_k$ --. Claim 9, column 16, line 22, " $\Psi$ 1" should read $|\Psi| \leq 1$ --. Claim 17, column 17, line 2, after "signal" insert -- $\Phi$ according to the relationship --.

Signed and Sealed this

Twenty-fourth Day of August 1976

[SEAL]

Attest:

RUTH C. MASON
*Attesting Officer*

C. MARSHALL DANN
*Commissioner of Patents and Trademarks*